(12) United States Patent
Flock et al.

(10) Patent No.: US 9,660,476 B2
(45) Date of Patent: May 23, 2017

(54) CIRCUIT ARRANGEMENT FOR DISCHARGING AN ELECTRICAL ENERGY STORE AND POWER CONVERTER COMPRISING SUCH A CIRCUIT ARRANGEMENT

(71) Applicant: Conti Temic microelectronic GmbH, Nuremberg (DE)

(72) Inventors: Stefan Flock, Roettenbach (DE); Uwe Krella, Nuremberg (DE); Olga Siwak, Nuremberg (DE)

(73) Assignee: CONTI TEMIC MICROELECTRONIC GMBH, Nuremberg (DE)

( * ) Notice: Subject to any disclaimer, the term of this patent is extended or adjusted under 35 U.S.C. 154(b) by 101 days.

(21) Appl. No.: 14/435,421

(22) PCT Filed: Oct. 10, 2013

(86) PCT No.: PCT/EP2013/071184
§ 371 (c)(1),
(2) Date: Jul. 8, 2015

(87) PCT Pub. No.: WO2014/057047
PCT Pub. Date: Apr. 17, 2014

(65) Prior Publication Data
US 2015/0357857 A1    Dec. 10, 2015

(30) Foreign Application Priority Data

Oct. 12, 2012   (DE) ..................... 10 2012 218 604

(51) Int. Cl.
*B60L 11/08*   (2006.01)
*B60L 11/00*   (2006.01)
(Continued)

(52) U.S. Cl.
CPC .......... *H02J 7/0081* (2013.01); *B60L 3/0007* (2013.01); *B60L 3/0069* (2013.01); *B60L 3/04* (2013.01);
(Continued)

(58) Field of Classification Search
CPC ... H02J 7/00; H02P 27/04; H02M 1/32; B60L 11/00; B60L 3/04
(Continued)

(56) References Cited

U.S. PATENT DOCUMENTS

| 4,574,341 A | 3/1986 | Hellegaard ................. 363/56.03 |
| 6,204,612 B1 | 3/2001 | Liu ............................... 315/291 |

(Continued)

FOREIGN PATENT DOCUMENTS

| DE | 19959716 A1 | 2/2001 | ............ H01H 83/00 |
| DE | 102006062101 A1 | 7/2008 | ................ B60L 3/04 |

(Continued)

OTHER PUBLICATIONS

International Search Report and Written Opinion, Application No. PCT/EP2013/071184, 25 pages, Jul. 22, 2014.

*Primary Examiner* — Kawing Chan
(74) *Attorney, Agent, or Firm* — Slayden Grubert Beard PLLC (57) ABSTRACT

A circuit assembly for discharging an electrical energy store includes a first discharge current path for uncontrolled, passive discharging of the energy store and for keeping a defined charge voltage of the energy store, and a second discharge current path for controlled, active discharging of the energy store. A semiconductor switch electrically connects to a positive current connection of the energy store and to a negative current connection of the energy store. A voltage limiter includes a first current connection for electrically connecting to the positive current connection of the (Continued)

energy store and a second current connection for electrically connecting to the negative current connection of the energy store. The circuit assembly further includes a first control path for providing a first control signal from the first current connection of the voltage limiter to the control connection of the semiconductor switch in order to control the semiconductor switch.

10 Claims, 4 Drawing Sheets

(51) Int. Cl.
*H02J 7/00* (2006.01)
*H02P 27/04* (2016.01)
*B60L 3/04* (2006.01)
*B60L 11/18* (2006.01)
*B60L 3/00* (2006.01)
*H02J 7/34* (2006.01)
*H02M 1/32* (2007.01)
*H02M 7/5387* (2007.01)

(52) U.S. Cl.
CPC ......... *B60L 11/005* (2013.01); *B60L 11/1803* (2013.01); *H02J 7/0029* (2013.01); *H02J 7/0047* (2013.01); *H02M 1/32* (2013.01); *H02P 27/04* (2013.01); *B60L 2210/40* (2013.01); *B60L 2220/14* (2013.01); *H02J 7/345* (2013.01); *H02J 2007/0037* (2013.01); *H02M 7/5387* (2013.01); *H02M 2001/322* (2013.01); *Y02T 10/7005* (2013.01); *Y02T 10/7241* (2013.01)

(58) Field of Classification Search
USPC .......................................... 318/504; 320/166
See application file for complete search history.

(56) References Cited

U.S. PATENT DOCUMENTS

| | | | |
|---|---|---|---|
| 8,937,471 B2* | 1/2015 | Kobayashi | H02M 1/32 320/166 |
| 2002/0140388 A1* | 10/2002 | Lee | H02H 3/025 318/445 |
| 2011/0057627 A1 | 3/2011 | Kuehner | 320/166 |
| 2011/0241581 A1 | 10/2011 | Flock et al. | 318/400.3 |

FOREIGN PATENT DOCUMENTS

| | | | | |
|---|---|---|---|---|
| DE | 102008010978 A1 | 8/2009 | | B60L 1/00 |
| DE | 102008061585 A1 | 6/2010 | | B60L 3/00 |
| EP | 2495854 A2 | 9/2012 | | H02M 1/32 |
| JP | 61191299 A | 8/1986 | | H02P 27/06 |
| JP | 8205401 A | 8/1996 | | H02J 1/00 |
| WO | 2014/057047 A2 | 4/2014 | | H02J 7/00 |

* cited by examiner

CIRCUIT ARRANGEMENT FOR DISCHARGING AN ELECTRICAL ENERGY STORE AND POWER CONVERTER COMPRISING SUCH A CIRCUIT ARRANGEMENT

CROSS-REFERENCE TO RELATED APPLICATIONS

This application is a U.S. National Stage Application of International Application No. PCT/EP2013/071184 filed Oct. 10, 2013, which designates the United States of America, and claims priority to DE Application No. 10 2012 218 604.2 filed Oct. 12, 2012, the contents of which are hereby incorporated by reference in their entirety.

TECHNICAL FIELD

The present invention relates to a circuit arrangement for discharging an electrical energy store, in particular a DC link capacitor of an electric or hybrid vehicle. In addition, the invention relates to a power converter for providing a current for an electric machine comprising a mentioned circuit arrangement.

BACKGROUND

In hybrid or electric vehicles, electrical energy stores which can store or provide current or electrical energy with a voltage of several hundred volts are used. Voltages of greater than 60 volts are hazardous to humans. Therefore, there are various safety requirements in accordance with which the mentioned electrical energy stores, such as, for example, the DC link capacitors of a vehicle, can only store a current with a voltage of more than 60 voltages for a short period of time if required and, in the event of a fault, such as, for example, in the event of a defect as a result of the vehicle being involved in an accident, or prior to maintenance work, can be actively discharged as quickly as possible to below 60 volts.

SUMMARY

One embodiment provides a circuit arrangement for discharging an electrical energy store, which circuit arrangement has the following features: a first discharge current path from a first, positive electrical connection of the energy store to a second, negative electrical connection of the energy store comprising a voltage limiter for uncontrolled, passive discharge of the energy store and for keeping a charging voltage of the energy store at least at a voltage threshold, wherein the voltage limiter has a first electrical connection for electrically connecting to the positive electrical connection of the energy store and a second electrical connection for electrically connecting to the negative electrical connection of the energy store; a second discharge current path from the positive electrical connection of the energy store to the negative electrical connection of the energy store in parallel with the first discharge current path comprising a semiconductor switch, which has an actuation connection and is controllable via this actuation connection, for controlled, active discharge of the energy store, wherein the semiconductor switch has a first electrical connection for electrically connecting to the positive electrical connection of the energy store and a second electrical connection for electrically connecting to the negative electrical connection of the energy store; and a first control path between the first electrical connection of the voltage limiter and the actuation connection of the semiconductor switch for providing a first control signal from the first electrical connection of the voltage limiter to the actuation connection of the semiconductor switch for actuating the semiconductor switch.

In a further embodiment, the first discharge current path between the positive electrical connection of the energy store and the voltage limiter also has a first current limiter for limiting a first discharge current in the first discharge current path in the case of passive discharge of the energy store.

In a further embodiment, the second discharge current path between the positive electrical connection of the energy store and the semiconductor switch also has a second current limiter for limiting a second discharge current in the second discharge current path in the case of active discharge of the energy store.

In a further embodiment, the first current limiter and/or the second current limiter are each in the form of a thick-film resistor.

In a further embodiment, the voltage limiter comprises a zener diode.

In a further embodiment, the circuit arrangement further comprises a discharge control unit for actuating the semiconductor switch, and a second control path between the discharge control unit and the actuation connection of the semiconductor switch for passing on a second control signal from the discharge control unit to the actuation connection of the semiconductor switch for actuating the semiconductor switch.

In a further embodiment, the circuit arrangement further comprises: an overcharging identification unit for identifying overcharging of the energy store; a first signal path and a second signal path between the overcharging identification unit and the first current limiter for measuring a first discharge voltage at the first current limiter; wherein the overcharging identification unit is designed to identify overcharging of the energy store on the basis of the first discharge voltage.

In a further embodiment, the circuit arrangement further comprises: a diagnosis unit for determining a switching state of the semiconductor switch, a third signal path and a fourth signal path between the diagnosis unit and the second current limiter for measuring a second discharge voltage at the second current limiter, wherein the diagnosis unit is designed to determine the switching state of the semiconductor switch on the basis of the second discharge voltage.

In a further embodiment, the circuit arrangement further comprises a first decoupling circuit unit for galvanically isolating the discharge control unit from the first control path, unit from the second discharge current path.

In a further embodiment, the circuit arrangement further comprises: a push-pull output stage unit comprising a control signal input connection, and a control signal output connection for actuating the semiconductor switch, wherein the control signal input connection is electrically connected to the first control path and the second control path, and the control signal output connection is electrically connected to the actuation connection of the semiconductor switch.

In a further embodiment, the push-pull output stage unit has a voltage supply connection, wherein the voltage supply connection is electrically connected to the first electrical connection of the voltage limiter.

In a further embodiment, the circuit arrangement further comprises a capacitor between the first electrical connection and the second electrical connection of the voltage limiter for providing an actuation current for actuating the semiconductor switch.

Another embodiment provides a power converter for providing a current for an electric machine, the power converter comprising: an electrical energy store for voltage stabilization in the power converter, and a circuit arrangement as disclosed above for passive and active discharge of the energy store.

BRIEF DESCRIPTION OF THE DRAWINGS

Example embodiments of the invention are explained in more detail below with reference to the attached drawings, in which.

DETAILED DESCRIPTION

Embodiments of the invention therefore consists in providing a safe, efficient and reliable way of discharging an electrical energy store in a motor vehicle.

Some embodiments provide a circuit arrangement for discharging an electrical energy store, in particular a DC link capacitor of a hybrid or electric vehicle, having the following features is provided.

Accordingly, the circuit arrangement has a first discharge current path from a first, positive electrical connection of the energy store to a second, negative electrical connection of the energy store comprising a voltage limiter for uncontrolled, passive discharge of the energy store and for keeping a charging voltage of the energy store at least at a voltage threshold. In this case, the voltage limiter has a first electrical connection for electrically connecting to the positive electrical connection of the energy store and a second electrical connection for electrically connecting to the negative electrical connection of the energy store.

The circuit arrangement additionally comprises a second discharge current path from the positive electrical connection of the energy store to the negative electrical connection of the energy store in parallel with the first discharge current path, comprising a semiconductor switch, which has an actuation connection and is controllable via this actuation connection, for controlled, active discharge of the energy store. In this case, the semiconductor switch has a first electrical connection for electrically connecting to the positive electrical connection of the energy store and a second electrical connection for electrically connecting to the negative electrical connection of the energy store. As a result, the semiconductor switch produces a closed circuit from the positive electrical connection of the energy store to the negative electrical connection of the energy store in a closed switching state.

In addition, the circuit arrangement comprises a first control path between the first electrical connection of the voltage limiter and the actuation connection of the semiconductor switch for providing a first control signal from the first electrical connection of the voltage limiter to the actuation connection of the semiconductor switch for actuating the semiconductor switch, for example for closing the semiconductor switch in a controlled manner with a voltage potential which is present at the first electrical connection of the voltage limiter. In this case, the semiconductor switch is designed in such a way that it can be closed, controlled by the voltage potential present at the first electrical connection of the voltage limiter, for active discharge of the energy store.

Uncontrolled, passive discharge of the energy store in this case means that the discharge of the energy store takes place automatically without a control signal or the like having had to actively instruct this discharge process. This occurs by the permanent discharge of the energy store by the closed circuit from the positive electrical connection of the energy store via the voltage limiter to the negative electrical connection of the energy store.

Controlled, active discharge of the energy store, on the other hand, means that the discharge process of the energy store only takes place by virtue of active closing or production of a closed discharge circuit in the second discharge current path. This advantageously takes place as a result of active closing of the semiconductor switch located in the second discharge current path by means of a change in the signal level of the control signal present at the actuation connection of the semiconductor switch.

The first control path is used for active, controlled closing of the semiconductor switch with a control voltage potential present at the first electrical connection of the voltage limiter and therefore for active, controlled discharge of the energy store. The semiconductor switch can be closed, controlled in a reliable manner as required, by the voltage or the voltage potential at the first electrical connection of the voltage limiter, which is maintained by the voltage limiter. Owing to the fact that this first control path, which is used for actively discharging the energy store in the event of a fault, for example, is arranged between the first and the second discharge current path, it is firstly possible for the components of the circuit arrangement through which currents with a voltage of over 60 V flow to be integrated monolithically in a closed circuit module. Secondly, a direct permanent control connection to the semiconductor switch for controlled closing of the semiconductor switch and therefore for active discharge of the energy store is ensured by the first control path. Owing to the fact that the first control path for active discharge of the energy store is between the first and second discharge current paths, this first control path is protected from a fault or damage at least as well as the two discharge current paths, so that active discharge of the energy store can be ensured in the event of a fault, for example.

By way of summary, an efficient and reliable possibility for active and passive discharge, depending on the situation, of the energy store, such as, for example, of a DC link capacitor of a vehicle, which can be implemented monolithically in a circuit module is provided by means of simple and inexpensive standard components.

In one embodiment, the first discharge current path between the positive electrical connection of the energy store and the voltage limiter has a first current limiter for limiting a first discharge current in the case of passive discharge of the energy store. In this case, the first current limiter advantageously comprises a first electrical connection for electrically connecting to the positive electrical connection of the energy store and a second electrical connection for electrically connecting to the first electrical connection of the voltage limiter. Therefore, the first current limiter is connected in series with the voltage limiter.

In a further embodiment, the second discharge current path between the positive electrical connection of the energy store and the semiconductor switch has a second current limiter for limiting a second discharge current in the case of active discharge of the energy store. In this case, the second current limiter advantageously comprises a first electrical connection for electrically connecting to the positive electrical connection of the energy store and a second electrical connection for electrically connecting to the first electrical connection of the voltage limiter. Therefore, the second current limiter is connected in series with the semiconductor switch.

By virtue of this first and this second current limiter, the first and second discharge currents, respectively, are limited to a preset or presettable maximum current value which is undamaging for the energy store, the voltage limiter or the semiconductor switch in the case of passive or active discharge of the energy store. Therefore, the two current limiters protect the energy store, the voltage limiter and the semiconductor switch from damage as a result of possibly excessively high discharge current. By virtue of the corresponding dimensioning of the first and second current limiters, for example the resistance value of the first and second current limiters, the rate of discharge of the energy store can also be adjusted.

In a further embodiment, the abovementioned two current limiters are each in the form of a thick-film resistor, which has advantageously been printed from resistive paste in a screen printing process onto a ceramic substrate material (for example $Al_2O_3$: aluminum oxide, AlN: aluminum nitride). In this case, the first current limiter preferably has a greater or a much greater resistance value than the second current limiter. As a result, quicker or much quicker discharge through the second discharge current path is ensured in the case of an active discharge process in comparison with a passive discharge process. Advantageously, the two thick-film resistors of the first and second current limiters are formed monolithically on one and the same substrate material.

In a further embodiment, the voltage limiter comprises a zener diode. In this case, the zener diode preferably has a cathode connection and an anode connection. It is electrically connected to the positive electrical connection of the energy store via the cathode connection and to the negative electrical connection of the energy store via its anode connection. The first control path connects the cathode connection of the zener diode electrically to the actuation connection of the semiconductor switch. The zener diode limits the charging voltage at the electrical energy store to a voltage value below 60 volts which is necessary for closing the semiconductor switch and keeping it in a closed switching state. As a result, it has been successful using a simple and inexpensive zener diode firstly to meet the required safety requirements and secondly to ensure active discharge of the energy store as required.

In a further embodiment, the circuit arrangement also has a discharge control unit for actuating or opening, in a controlled manner, the semiconductor switch and a second control path between the discharge control unit and the actuation connection of the semiconductor switch, wherein the second control path is used for passing on or providing a second control signal from the discharge control unit to the actuation connection of the semiconductor switch for actuating the semiconductor switch. This second control signal keeps the semiconductor switch in an open switching state so that the second discharge current path remains in a switched-off, i.e. non-conducting state.

In a further embodiment, the circuit arrangement also has an overcharging identification unit for identifying overcharging of the energy store. In addition, a first and a second signal path are provided between the overcharging identification unit and the first current limiter for measuring a first discharge voltage at the first current limiter. In this case, the overcharging identification unit is designed to identify overcharging of the energy store on the basis of the first discharge voltage. Via the two signal paths, the overcharging identification unit detects a discharge voltage drop across the first current limiter which reflects the charging voltage of the energy store, and therefore identifies possible overcharging of the energy store. If required, the semiconductor switch in the second discharge current path can be closed for a short period of time and can thus discharge the energy store down to an uncritical charging voltage. As a result, the possibility is provided of protecting the energy store from damage as a result of overcharging.

In a further embodiment, the circuit arrangement also comprises a diagnosis unit for determining a switching state of the semiconductor switch. In this case in addition a third and a fourth signal path are provided between the diagnosis unit and the second current limiter for measuring a second discharge voltage at the second current limiter. Via these third and fourth signal paths, the diagnosis unit detects a second discharge voltage drop across the second current limiter during an active discharge process of the energy store and, on the basis of the detected second discharge voltage, determines the switching state of the semiconductor switch. As a result, it is possible to check the switching state of the semiconductor switch and consequently also check the discharge process of the controlled active discharge of the energy store.

In a further embodiment, decoupling circuit units are provided in the circuit arrangement, each of which decoupling circuit units is arranged between the discharge control unit and the first control path, between the overcharging identification unit and the first discharge current path or between the diagnosis unit and the second discharge current path. These three decoupling circuit units are each provided for gavanically isolating the discharge control unit from the first control path and therefore from the first discharge current path, the overcharging identification unit from the first discharge current path and the diagnosis unit from the second discharge current path, respectively. These galvanic isolations ensure that the charging voltage at the energy store, i.e. the voltage between the positive and negative electrical connections of the energy store, which exceeds a voltage value of well over 60 volts, does not reach these circuit units and damage them.

In a further embodiment, the circuit arrangement also has a push-pull output stage unit comprising a control signal input connection and a control signal output connection for actuating the semiconductor switch. In this case, the control signal input connection is electrically connected to the first and second control paths. The control signal output connection is electrically connected to the actuation connection of the semiconductor switch. As a result, the push-pull output stage unit passes on the first control signal, which is present at the first control path, or the second control signal, which is present at the second control path, optionally to the actuation connection of the semiconductor switch, depending on the signal level. With the push-pull output stage unit, therefore, a simple circuit is realized with which the control signal from the first and second control paths can be amplified in a simple manner. With the control signal amplified in this way, the actuation connection of the semiconductor switch can be subjected to charge reversal quickly and the semiconductor switch can therefore be switched over relatively quickly and with low power losses.

In a further embodiment, the push-pull output stage unit is provided with a voltage supply connection, wherein this voltage supply connection is electrically connected to the first electrical connection of the first voltage limiter. As a result, the push-pull output stage unit with the current provided by the energy store can amplify the control signals and pass these control signals on to the actuation connection of the semiconductor switch. As a result, an additional current source for the push-pull output stage unit can be dispensed with.

In a further embodiment, the circuit arrangement also has a capacitor unit between the first and second electrical connections of the voltage limiter for providing an actuation current, with which the semiconductor switch can be switched over quickly.

In a further embodiment, a power converter for providing a current for an electric machine is specified, wherein the power converter has an electrical energy store for voltage stabilization in the power converter and an above-described circuit arrangement for the passive and active discharge of the energy store.

Advantageous configurations of the above-described circuit arrangement can also be considered to be advantageous configurations of the power converter insofar as they are transferrable to the above-mentioned power converter.

Figure 1:
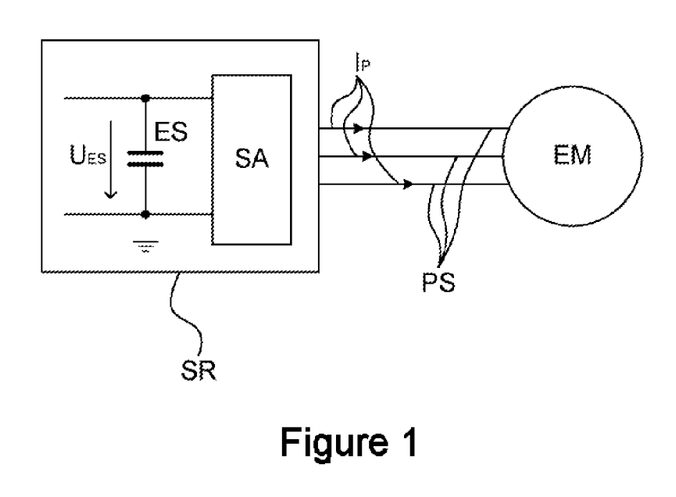
FIG. 1 shows a schematic illustration of a power converter for providing electrical energy or a current for an electric machine comprising a circuit arrangement in accordance with one embodiment of the invention.

Reference will first be made to FIG. 1, in which an electric machine EM and a power converter SR are illustrated schematically. The electric machine EM is in the form of a synchronous machine, for example, and is used for driving an electric or hybrid vehicle (not illustrated in the figure). The power converter SR is used for providing phase currents Ip for the electric machine EM. The power converter SR is connected to the electric machine EM via three current phases PS and supplies phase currents Ip to the electric machine EM via these current phases PS. The power converter SR comprises a DC link capacitor ES as electrical energy store for voltage stabilization in the power converter SR and for storing the induced current which is induced by the electric machine EM and is fed back to the power converter SR. Depending on the power of the electric machine EM, electrical charge with a charging voltage of several hundred volts can be buffer-stored in the DC link capacitor ES. Voltages which are higher than 60 volts are hazardous to humans. Therefore, the DC link capacitor ES can only keep the electric charge stored for a short period of time. In the event of an accident involving the vehicle or during maintenance work on the power converter SR, the DC link capacitor ES needs to be actively discharged as quickly as possible down to a charging voltage of below 60 volts. For this purpose, the power converter SR has a circuit arrangement SA for the passive and active discharge of the DC link capacitor ES.

Figure 2:
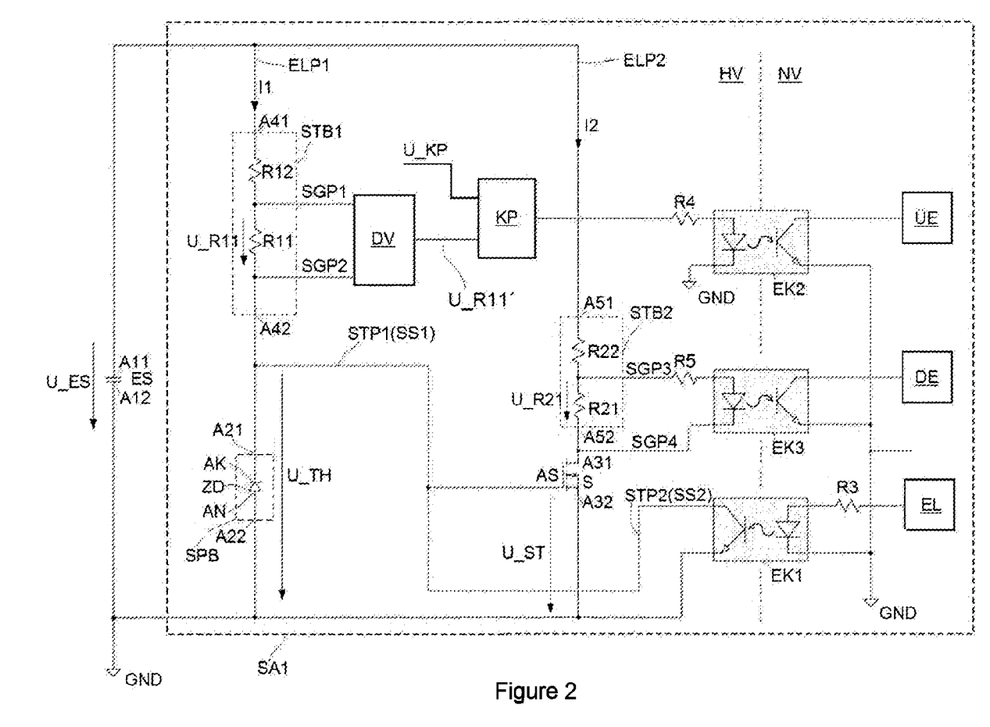
FIG. 2 shows a schematic illustration of a circuit arrangement in accordance with a first embodiment of the invention.

An embodiment of this circuit arrangement SA1 is illustrated in detail in FIG. 2. FIG. 2 shows a DC link capacitor ES and a circuit arrangement SA1 for the active and passive discharge of the DC link capacitor ES. The DC link capacitor ES comprises a first, positive electrical connection A11 and a second, negative electrical connection A12, wherein the negative electrical connection A12 is electrically connected to the ground connection GND of the power converter (not illustrated in the figure).

The circuit arrangement SA1 has a first discharge current path ELP1 for the passive discharge of the DC link capacitor ES or for connecting a first discharge current I1, and a second discharge current path ELP2 for the active discharge of the energy store ES or for connecting a second discharge current I2. In this case, the first and second discharge current paths ELP1 and ELP2 are connected in parallel with one another and each connect the positive electrical connection A11 of the DC link capacitor ES to the negative electrical connection A12 of the DC link capacitor ES.

In the first discharge current path ELP1, the circuit arrangement SA1 has a first current limiter STB1 for limiting the discharge current I1 in the passive discharge process and a voltage limiter SPB for holding the charging voltage U_ES of the DC link capacitor ES at a minimum provided voltage threshold U_TH. In this case, the first current limiter STB1 comprises a first electrical connection A41 and a second electrical connection A42 and is electrically connected to the positive electrical connection A11 of the DC link capacitor ES via the first electrical connection A41. The voltage limiter SPB for its part comprises a first electrical connection A21 and a second electrical connection A22 and is electrically connected to the second electrical connection A42 of the first current limiter STB1 via the first electrical connection A21 and to the negative electrical connection A12 of the DC link capacitor ES via the second electrical connection A22.

The first current limiter STB1 comprises a first resistor R11 and a second resistor R12 connected in series between the first and second electrical connections A41 and A42. The two resistors R11 and R12 therefore act as a voltage divider. The voltage limiter SPB for its part contains a zener diode ZD comprising a cathode connection AK and an anode connection AN. In this case, the zener diode ZD is electrically connected to the second electrical connection A42 of the first current limiter STB1 via the cathode connection AK and to the second negative electrical connection A12 of the DC link capacitor ES and therefore also to the ground connection GND via the anode connection AN. Therefore, the voltage limiter SPB holds the charging voltage U_ES of the DC link capacitor ES at a voltage threshold U_TH, which corresponds to the reverse voltage of the zener diode ZD.

In the second discharge current path ELP2, the circuit arrangement SA1 has a second current limiter STB2 and a semiconductor switch S connected in series. The second current limiter STB2 comprises a first electrical connection A51 and a second electrical connection A52, and is electrically connected to the positive electrical connection of the DC link capacitor ES via the first electrical connection A51. The second current limiter STB2 has a first resistor R21 and a second resistor R22 connected in series between the first and second electrical connections A51 and A52. In this case, the total resistance value of the first current limiter STB1, i.e. the sum of the resistance values of the first and second resistors R11 and R12 of the first current limiter STB1, is greater than the total resistance value of the second current limiter STB2, i.e. the sum of the resistance values of the first and second resistors R21 and R22 of the second current limiter STB2.

The semiconductor switch S comprises a first electrical connection A31 and a second electrical connection A32 and, between the first and second electrical connections, a load path for connecting the second discharge current I2 from the first electrical connection A31 to the second electrical connection A32. The semiconductor switch S is electrically connected to the second electrical connection A52 of the second current limiter STB2 via the first electrical connection A31. The semiconductor switch S is electrically connected to the negative electrical connection A12 of the DC link capacitor ES or to the ground connection GND by the second electrical connection A32.

The semiconductor switch S furthermore has a control connection AS, via which the semiconductor switch S is closed and opened, or switched on and switched off, by means of actuation. The circuit arrangement SA1 has a first control path STP1 between the actuation connection AS of the semiconductor switch S and the first electrical connection A21 of the voltage limiter STB, via which first control path the first control signal SS1 can be applied to the actuation connection AS for closing the semiconductor switch S.

The circuit arrangement SA1 furthermore has a discharge control unit EL for actuating the semiconductor switch S. A second control path STP2 for passing on a second control signal SS2 from the discharge control unit EL to the actuation connection AS is provided between the discharge control unit EL and the actuation connection AS of the semiconductor switch S.

Owing to a high charging voltage in the case of the DC link capacitor ES, a voltage of up to several hundred volts is present in the first and second discharge current paths ELP1 and ELP2 and the first control path STP1 and therefore at the actuation connection AS of the semiconductor switch S, said voltage being far above the intended operating voltage of the discharge control unit EL and therefore being capable of damaging said discharge control unit under certain circumstances. In order to protect the discharge control unit EL from such a high voltage, the circuit arrangement SA1 has a first decoupling circuit unit EK1 in the second control path STP2 or between the actuation connection AS of the semiconductor switch S and the discharge control unit EL, said decoupling circuit unit serving to galvanically isolate the discharge control unit EL from the first control path STP1. In this case, the first decoupling circuit unit EK1 is in the form of an optocoupler comprising a light-emitting diode, which is electrically connected to the discharge control unit EL, as optical transmitter and a phototransistor, which is electrically connected to the second control path STP2, as optical receiver. The circuit arrangement SA1 also has a series resistor R3 for limiting the current flowing through the light-emitting diode of the decoupling circuit unit EK1 between the discharge control unit EL and the first decoupling circuit unit EK1.

The circuit arrangement SA1 furthermore has a monitoring unit ÜE for monitoring overcharging of the DC link capacitor ES. In addition, the circuit arrangement SA1 has in each case a first signal path SGP1 and a second signal path SGP2 for measuring a voltage U_R11 which is present at the first resistor R11 of the current limiter STB1 and which is proportional to the charging voltage U_ES of the DC link capacitor ES, between the node of the two resistors R11 and R12 of the first current limiter STB1 and the monitoring unit ÜE and between the second electrical connection A42 of the first current limiter STB1 and the monitoring unit ÜE. This measured voltage U_R11 is amplified by a differential amplifier DV, which is arranged between the two signal paths SGP1 and SGP2 and the monitoring unit ÜE, and is passed on to a comparator KP as amplified measured voltage U_R11', which comparator is arranged between the differential amplifier DV and the monitoring unit ÜE.

The comparator KP compares the amplified measured voltage U_R11' with a preset or presettable reference voltage U_KP which is indicative of an optimal charging voltage in the DC link capacitor ES.

The circuit arrangement SA1 has a second decoupling circuit unit EK2 for galvanically isolating the monitoring unit ÜE from the comparator KP or from the second discharge current path ELP2, between the comparator KP and the monitoring unit ÜE. In this case, the second decoupling circuit unit EK2 is likewise in the form of an optocoupler comprising a light-emitting diode, which is electrically connected to the comparator KP, as optical transmitter and a phototransistor, which is electrically connected to the monitoring unit ÜE, as optical receiver. Between the comparator KP and the second decoupling circuit unit EK2, the circuit arrangement SA1 also comprises a series resistor R4 for limiting the current flowing through the light-emitting diode of the decoupling circuit unit EK2.

The circuit arrangement SA1 also has a diagnosis unit DE for determining a switching state of the semiconductor switch S. For this purpose, the circuit arrangement SA1 has in each case a third signal path SGP3 and a fourth signal path SGP4 for measuring a voltage U_R21, which is present at the first resistor R21 of the current limiter STB2 and which is indicative of a switching state of the semiconductor switch S, between the node point of the two resistors R21 and R22 of the second current limiter STB2 and the diagnosis unit DE and between the second electrical connection A52 of the second current limiter STB2 and the diagnosis unit DE.

In order to protect the diagnosis unit DE from damage as a result of the high voltages prevailing in the second discharge current path ELP2, the circuit arrangement SA1 has a third decoupling circuit unit EK3 between the diagnosis unit DE and the second discharge current path ELP2, said third decoupling circuit unit being used for galvanically isolating the diagnosis unit DE from the second discharge current path ELP2. In this case, the third decoupling circuit unit EK3 is also in the form of an optocoupler comprising a light-emitting diode, which is electrically connected to the second discharge current path ELP2, as optical transmitter and a phototransistor, which is electrically connected to the diagnosis unit DE, as optical receiver. In addition, the circuit arrangement SA1 comprises a series resistor R5 for limiting the current flowing through the light-emitting diode of the decoupling circuit unit EK3 at the third signal path SGP3.

As a result, the three decoupling circuit units EK1, EK2 and EK3 divide the circuit arrangement SA1 into a first voltage region HV with a voltage level of several hundred volts and a second voltage region NV with a voltage level of up to a few tens of volts, which does not exceed 60 volts, however. In this case, the first voltage region HV comprises the first and second discharge current paths ELP1 and ELP2 together with the electrical and electronic components STB1, SPB, DV, KP, STB2 and S in these two discharge current paths ELP1 and ELP2 and the first control path STP1. The second voltage region NV comprises the monitoring unit ÜE, the diagnosis unit DE and the discharge control unit EL, which are intended to be protected from a voltage of several hundred volts prevailing in the first voltage region HV.

During operation of the vehicle, the DC link capacitor ES stores the induced currents induced by the electric machine EM and fed back to the power converter and therefore compensates for the voltage fluctuations in the power converter. Since the power converter provides a voltage of several hundred volts in phase currents for the electric machine, the DC link capacitor ES can be charged with a charging voltage of up to several hundred volts. Owing to the diverse safety requirements, the current buffer-stored in the DC link capacitor ES needs to be discharged uninterrupted without external intervention being required for this purpose. In the case of an accident involving the vehicle or prior to maintenance work in the power converter, the DC link capacitor ES needs to be actively discharged down to below 60 volts in a very short period of time.

The passive discharge of the DC link capacitor ES without any external influence takes place by means of the first discharge current path ELP1 of the circuit arrangement SA1. By virtue of the permanently closed circuit from the positive electrical connection A11 of the DC link capacitor ES via the first current limiter STB1 and the voltage limiter SPB and then to the negative electrical connection A12 of the DC link capacitor ES, the DC link capacitor ES is discharged uninterrupted as long as the charging voltage U_ES of the DC link capacitor ES drops to the reverse voltage of the zener diode ZD, namely the voltage threshold U_TH of the voltage limiter SPB. By virtue of the suitable selection of the resistance values of the two resistors R11 and R12 in the first current limiter STB1, the rate of discharge at the DC link capacitor ES can be set. By suitable selection of the zener diode ZD, the voltage threshold U_TH which is below 60 volts and therefore meets the mentioned safety requirements can be set. As long as the voltage which is present at the zener diode ZD is higher than the reverse voltage of the zener diode ZD, the zener diode ZD has a low-resistance behavior and therefore conducts the discharge current I1.

In this state, the discharge control unit EL sends/conducts a current to/through the light-emitting diode of the first decoupling circuit unit EK1, which is in the form of an optocoupler, and said current is converted by the light-emitting diode into an optical signal and transmitted to the phototransistor of the decoupling circuit unit EK1. Controlled by this optical signal, the phototransistor is closed and connects the actuation connection AS of the semiconductor switch S to the ground potential at the ground connection GND. As a result, the semiconductor switch S is opened and no active discharge of the DC link capacitor ES through the second discharge current path ELP2 takes place. In this case, the passive discharge through the path by the first current limiter STB1, the first and second control paths STP1 and STP2, and the phototransistor of the decoupling circuit unit EK1 to the ground potential at the ground connection GND takes place.

If, for example, an accident involving the vehicle is identified by means of, for example, a delay sensor provided for this purpose (not illustrated in the figure), the discharge control unit EL interrupts the current flow to the light-emitting diode of the first decoupling circuit unit EK1 and therefore the optical signal at the phototransistor of the decoupling circuit unit EK1. The phototransistor is therefore opened and thus interrupts the electrical connection between the actuation connection AS of the semiconductor switch S and the ground potential at the ground connection GND. Since the first electrical connection A21 of the voltage limiter SPB is still electrically connected to the actuation connection AS of the semiconductor switch S by the first control path STP1, the actuation connection AS is now held at the voltage potential of the first electrical connection A21 of the voltage limiter SPB, which, owing to corresponding dimensioning of the zener diode ZD, is, based on the ground potential at the ground connection GND, at or above the minimum switch-on voltage U_ST required for closing the semiconductor switch S and therefore closes the semiconductor switch S and holds it in this closed switching state. As a result, the semiconductor switch S is conducting and active discharge of the DC link capacitor ES through the second discharge current path ELP2 follows. Owing to the fact that the total resistance of the first current limiter STB1 is greater than the total resistance of the second current limiter STB2, the electrical charge in the DC link capacitor ES is largely discharged through the second discharge current path ELP2 with a low total resistance. The discharge during active discharge through the second discharge current path ELP2 therefore takes place more quickly than in the case of only passive discharge through the first discharge current path ELP1.

Overcharging of the DC link capacitor ES is determined by the circuit arrangement SA1 as follows: the voltage drop U_R11 across the first resistor R11 of the first current limiter STB1, which voltage drop is proportional to the charging voltage U_ES of the DC link capacitor ES, is measured and amplified by the differential amplifier DV. The measured voltage U_R11' amplified in this way is then compared with a reference voltage U_KP, by a downstream comparator KP, said reference voltage reflecting the optimum charging voltage of the DC link capacitor ES.

If the amplified measured voltage U_R11' is less than or equal to the reference voltage U_KP, the comparator KP does not pass on any current to the second decoupling circuit unit EK2, which is likewise in the form of an optocoupler, which corresponds to transmission of a signal with a signal level of logic ZERO. The light-emitting diode of the second decoupling circuit unit EK2 therefore does not transmit an optical signal to the phototransistor, and therefore the phototransistor is open and does not conduct any current from the overcharging identification unit ÜE. The overcharging identification unit ÜE thus establishes that the DC link capacitor ES is not overcharged.

If the amplified measured voltage U_R11' is higher than the reference voltage U_KP, the comparator KP transmits a current, i.e. a signal with a signal level of logic ONE, to the second decoupling circuit unit EK2. The light-emitting diode of the second decoupling circuit unit EK2 thus transmits an optical signal to the phototransistor, therefore the phototransistor is closed and conducts a current from the overcharging identification unit ÜE to the ground connection GND. The overcharging identification unit ÜE thus establishes that the DC link capacitor ES is overcharged.

A switching state of the semiconductor switch S is determined by the circuit arrangement SA1 with the aid of the diagnosis unit DE as follows: if the semiconductor switch S is closed in a fault-free manner, some of the discharge current I2 flows in the second discharge current path ELP2 through the third signal path SGP3, the light-emitting diode of the third decoupling circuit unit EK3 and the fourth signal path SGP4 and then back to the second discharge current path ELP2. As a result, the light-emitting diode transmits an optical signal to the phototransistor, which is then closed and thus conducts a current from the diagnosis unit DE to the ground connection GND. The diagnosis unit DE therefore establishes that the semiconductor switch S is closed.

If the semiconductor switch S is open in a fault-free manner, no current flows through the light-emitting diode of the third decoupling circuit unit EK3. As a result, the light-emitting diode does not transmit an optical signal to the phototransistor, which is then opened and thus does not conduct any current from the diagnosis unit DE to the ground connection GND. The diagnosis unit DE therefore establishes that the semiconductor switch S is open.

Figure 3:
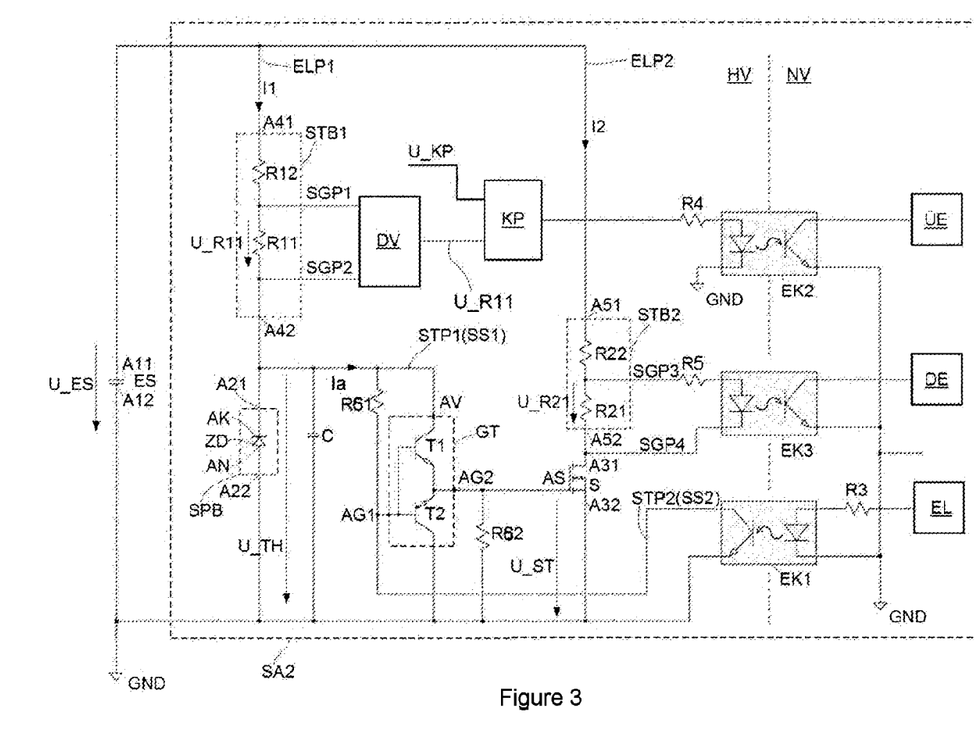
FIG. 3 shows a schematic illustration of a circuit arrangement in accordance with a second embodiment of the invention.

Since the circuit arrangement SA1 in accordance with the first embodiment of the invention has been described with the aid of FIG. 2, reference is now made to FIG. 3, in which a further circuit arrangement SA2 in accordance with a second embodiment of the invention is shown schematically.

In contrast to the circuit arrangement SA1 in FIG. 2, the circuit arrangement SA2 in FIG. 3 has a push-pull output stage unit GT for quick switchover of the semiconductor switch S. In this case, the push-pull output stage unit GT comprises a control signal input connection AG1 and a control signal output connection AG2 for actuating the semiconductor switch S, wherein the control signal input connection AG1 is electrically connected to the first and second control paths STP1 and STP2, and the control signal output connection AG2 is electrically connected to the actuation connection AS of the semiconductor switch S. The push-pull output stage unit GT furthermore has a voltage supply connection AV, which is electrically connected to the first electrical connection A21 of the voltage limiter SPB. The push-pull output stage unit GT receives the current required for actuating the semiconductor switch S from the DC link capacitor ES via this voltage supply connection AV. The circuit arrangement SA2 furthermore has a first resistor R61 between the first electrical connection A21 of the voltage limiter SPB and the control signal input connection AG1 of the push-pull output stage unit GT for setting the current at the control signal input connection AG1. In addition, the circuit arrangement SA2 has a second resistor R62 between the control signal output connection AG2 of the push-pull output stage unit GT and the ground connection GND for applying the actuation connection AS of the semiconductor switch S to the ground potential at the ground connection GND during the switchover processes in order that the actuation connection AS does not assume an undefined voltage potential.

During operation of the circuit arrangement SA2, the push-pull output stage unit GT passes on the first control signal SS1 present at the first control path STP1 or the second control signal SS2 present at the second control path STP2, amplified, to the actuation connection AS of the semiconductor switch S, depending on the signal level. With the control signal SS1, SS2 amplified in this way, the actuation connection AS of the semiconductor switch S can be subjected to charge reversal quickly and the semiconductor switch S can therefore be switched over relatively quickly and with low power losses.

The circuit arrangement SA2 furthermore comprises a capacitor C between the first and second electrical connections A21 and A22 of the voltage limiter SPB for providing an actuation current Ia required for quickly actuating the semiconductor switch S or for quickly subjecting the input capacitances of the actuation connection AS to charge reversal.

Figure 4:
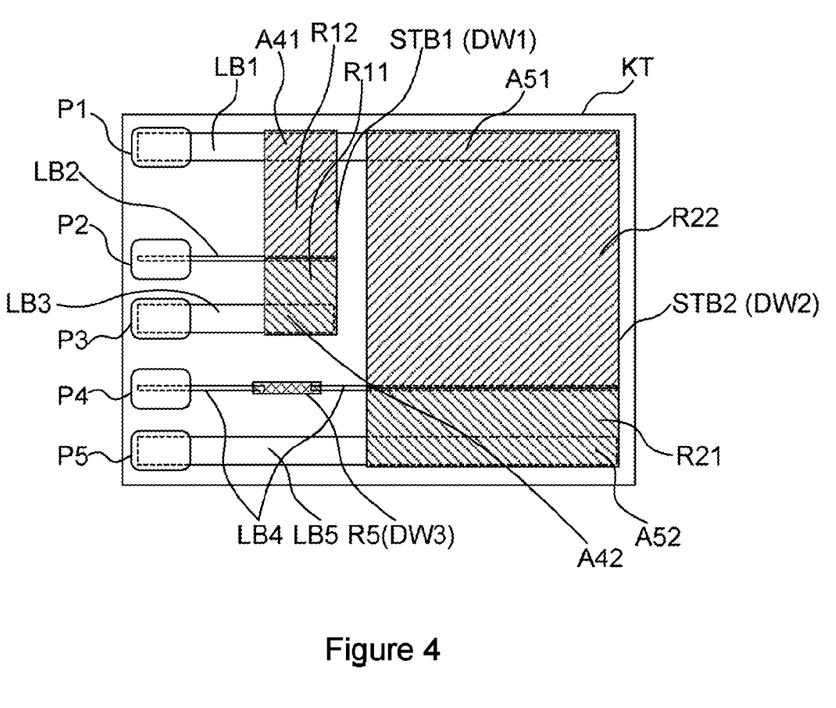
FIG. 4 shows a schematic illustration of an embodiment of a first and a second current limiter of the circuit arrangements illustrated in FIGS. 2 and 3.

Since the two circuit arrangements SA1 and SA2 in accordance with two embodiments of the invention have been described with the aid of FIGS. 1 and 2, reference is now made to FIG. 4, in which an embodiment of the first and second current limiters STB1 and STB2 of the two above-described circuit arrangements SA1 and SA2 is shown as a plan view of a printed substrate part schematically.

Accordingly, the two current limiters STB1 and STB2 are each in the form of a first thick-film resistor DW1 and a second thick-film resistor DW2, respectively, which have advantageously been printed from resistive paste in a screen printing process onto a ceramic substrate part KT (for example consisting of $Al_2O_3$, AlN). In this case, the second thick-film resistor DW2 and therefore the second current limiter STB2, which is in the form of the second thick-film resistor DW2, has a greater width than the first thick-film resistor DW1, and therefore than the first current limiter STB1, which is in the form of the first thick-film resistor DW1. As a result, the second current limiter STB2 has a lower total resistance value than the first current limiter STB1. As a result, quicker discharge through the second discharge current path ELP2 in the case of an active discharge process is ensured in comparison with a passive discharge process with only the first discharge current path ELP1.

The first and second thick-film resistors DW1 and DW2 are electrically connected to one another and to a first electrical connection P1 via a first conductor track LB1. In this case, the region of overlap between the first thick-film resistor DW1 and the first conductor track LB1 forms the first electrical connection A41 of the first current limiter STB1. The region of overlap between the second thick-film resistor DW2 and the first conductor track LB1 forms the first electrical connection A51 of the second current limiter STB2. The first conductor track LB1 forms part of the electrical connection between the positive electrical connection A11 of the DC link capacitor ES and the first electrical connection A41 of the first current limiter STB1 and the first electrical connection A51 of the second current limiter STB2 and therefore forms part of the first and second discharge current paths ELP1 and ELP2. The first electrical connection P1 can be soldered directly and therefore electrically connected directly to the positive electrical connection A11 of the DC link capacitor ES.

A second conductor track LB2 divides the first thick-film resistor DW1 into a smaller and a larger area, wherein the smaller area of the first thick-film resistor DW1 forms the first resistor R11 of the first current limiter STB1 and the larger area of the first thick-film resistor DW1 forms the second resistor R12 of the first current limiter STB1. The second conductor track LB2 is therefore part of the first signal path SGP1 and connects the first and second resistors R11 and R12 of the first current limiter STB1 to one another and to a second electrical connection P2, which forms the connection of the first signal path SGP1 to the differential amplifier DV.

A third conductor track LB3 connects the smaller area of the first thick-film resistor DW1 or the first resistor R11 of the first current limiter STB1 to a third electrical connection P3, which forms the first electrical connection A21 of the voltage limiter SPB. The region of overlap between the first thick-film resistor DW1 and the third conductor track LB3 therefore forms the second electrical connection A42 of the first current limiter STB1.

A fourth conductor track LB4 divides the second thick-film resistor DW2 into a smaller and a larger area, wherein the smaller area of the second thick-film resistor DW2 forms the first resistor R21 of the second current limiter STB2 and the larger area of the second thick-film resistor DW2 forms the second resistor R22 of the second current limiter STB2. The fourth conductor track LB4 is therefore part of the third signal path SGP3 and connects the first and second resistors R21 and R22 of the second current limiter STB2 to one another and to the series resistor R5, which is likewise in the form of a thick-film resistor DW3, and then to an electrical connection P4, which forms the connection of the third signal path SGP3 to the third decoupling circuit unit EK3.

A fifth conductor track LB5 connects the smaller area of the second thick-film resistor DW2 or the first resistor R21 of the second current limiter STB2 to a fifth electrical connection P5, which forms the first electrical connection A31 of the semiconductor switch S. The region of overlap between the second thick-film resistor DW2 and the fifth conductor track LB5 therefore forms the second electrical connection A52 of the second current limiter STB2.

A passivation layer for protecting the thick-film resistors and the conductor tracks from corrosion is applied to the thick-film resistors DW1, DW2 and DW3 and the conductor tracks LB1, LB2, LB3, LB4 and LB5, said passivation layer closing off the thick-film resistors DW1, DW2 and DW3 and the conductor tracks LB1, LB2, LB3, LB4 and LB5 in an air-tight manner.

The substrate part KT is arranged flat on a heat sink (not illustrated in the figure) so that the heat arising in the thick-film resistors DW1, DW2 and DW3 can be dissipated better via the heat sink.

What is claimed is:

1. A circuit arrangement for discharging an electrical energy store, the circuit arrangement comprising:
   a first discharge current path from a first, positive electrical connection of the energy store to a second, negative electrical connection of the energy store, the first discharge current path comprising:
      a voltage limiter for uncontrolled, passive discharge of the energy store and for keeping a charging voltage of the energy store at least at a voltage threshold; and
      a first current limiter for limiting a first discharge current in the first discharge current path in the case of passive discharge of the energy store;
      wherein the voltage limiter has a first electrical connection connected to the positive electrical connection of the energy store and a second electrical connection connected to the negative electrical connection of the energy store;
   a second discharge current path from the positive electrical connection of the energy store to the negative electrical connection of the energy store in parallel with the first discharge current path, the second discharge path comprising a semiconductor switch with an actuation connection and controllable via the actuation connection for controlled, active discharge of the energy store;
   wherein the semiconductor switch has a first electrical connection connected to the positive electrical connection of the energy store and a second electrical connection connected to the negative electrical connection of the energy store;
   a first control path between the first electrical connection of the voltage limiter and the actuation connection of the semiconductor switch providing a first control signal from the first electrical connection of the voltage limiter to the actuation connection of the semiconductor switch for actuating the semiconductor switch; and
   an overcharging identification unit for identifying overcharging of the energy store;
   a first signal path and a second signal path between the overcharging identification unit and the first current limiter for measuring a first discharge voltage at the first current limiter;
   wherein the overcharging identification unit is designed to identify overcharging of the energy store on the basis of the first discharge voltage.

2. The circuit arrangement of claim 1, wherein the first current limiter and/or the second current limiter are each in the form of a thick-film resistor.

3. The circuit arrangement of claim 1, wherein the voltage limiter comprises a zener diode.

4. The circuit arrangement of claim 1, further comprising a capacitor between the first electrical connection and the second electrical connection of the voltage limiter for providing an actuation current for actuating the semiconductor switch.

5. The circuit arrangement of claim 1, further comprising a second decoupling circuit unit for galvanically isolating the overcharging identification unit from the first discharge current path.

6. A circuit arrangement for discharging an electrical energy store, the circuit arrangement comprising:
   a first discharge current path from a first, positive electrical connection of the energy store to a second, negative electrical connection of the energy store, the first discharge current path comprising a voltage limiter for uncontrolled, passive discharge of the energy store and for keeping a charging voltage of the energy store at least at a voltage threshold;
   wherein the voltage limiter has a first electrical connection connected to the positive electrical connection of the energy store and a second electrical connection connected to the negative electrical connection of the energy store;
   a second discharge current path from the positive electrical connection of the energy store to the negative electrical connection of the energy store in parallel with the first discharge current path, the second discharge path comprising:
      a semiconductor switch with an actuation connection and controllable via the actuation connection for controlled, active discharge of the energy store; and
      a second current limiter for limiting a second discharge current in the second discharge current path in the case of active discharge of the energy store;
      wherein the semiconductor switch has a first electrical connection connected to the positive electrical connection of the energy store and a second electrical connection connected to the negative electrical connection of the energy store;
   a first control path between the first electrical connection of the voltage limiter and the actuation connection of the semiconductor switch providing a first control signal from the first electrical connection of the voltage limiter to the actuation connection of the semiconductor switch for actuating the semiconductor switch;
   a diagnosis unit for determining a switching state of the semiconductor switch; and
   a third signal path and a fourth signal path between the diagnosis unit and the second current limiter for measuring a second discharge voltage at the second current limiter;
   wherein the diagnosis unit determines the switching state of the semiconductor switch on the basis of the second discharge voltage.

7. The circuit arrangement of claim 6, further comprising a third decoupling circuit unit for galvanically isolating the diagnosis unit from the second discharge current path.

8. A circuit arrangement for discharging an electrical energy store, the circuit arrangement comprising:
   a first discharge current path from a first, positive electrical connection of the energy store to a second, negative electrical connection of the energy store, the first discharge current path comprising a voltage limiter for uncontrolled, passive discharge of the energy store and for keeping a charging voltage of the energy store at least at a voltage threshold;
   wherein the voltage limiter has a first electrical connection connected to the positive electrical connection of the energy store and a second electrical connection connected to the negative electrical connection of the energy store;

a second discharge current path from the positive electrical connection of the energy store to the negative electrical connection of the energy store in parallel with the first discharge current path, the second discharge path comprising a semiconductor switch with an actuation connection controlled by a discharge control unit for controlled, active discharge of the energy store;

wherein the semiconductor switch has a first electrical connection connected to the positive electrical connection of the energy store and a second electrical connection connected to the negative electrical connection of the energy store; and a first control path between the first electrical connection of the voltage limiter and the actuation connection of the semiconductor switch providing a first control signal from the first electrical connection of the voltage limiter to the actuation connection of the semiconductor switch for actuating the semiconductor switch;

a second control path between the discharge control unit and the actuation connection of the semiconductor switch for passing on a second control signal from the discharge control unit to the actuation connection of the semiconductor switch for actuating the semiconductor switch;

a push-pull output stage unit comprising a control signal input connection; and a control signal output connection for actuating the semiconductor switch;

wherein the control signal input connection is electrically connected to the first control path and the second control path, and the control signal output connection is electrically connected to the actuation connection of the semiconductor switch.

9. The circuit arrangement of claim 8, further comprising a first decoupling circuit unit for galvanically isolating the discharge control unit from the first control path unit from the second discharge current path.

10. The circuit arrangement of claim 8, wherein the push-pull output stage unit has a voltage supply connection, wherein the voltage supply connection is electrically connected to the first electrical connection of the voltage limiter.

* * * * *